United States Patent
Phadnis et al.

(10) Patent No.: US 6,981,064 B1
(45) Date of Patent: Dec. 27, 2005

(54) SUPPORTING MULTIPLE POINT-TO-POINT SESSIONS BETWEEN NETWORK DEVICES ON AN ATM BACKBONE

(75) Inventors: Amit Phadnis, Karnataka (IN); Pankaj Vyas, Karnataka (IN)

(73) Assignee: Cisco Technology, Inc, San Jose, CA (US)

( * ) Notice: Subject to any disclaimer, the term of this patent is extended or adjusted under 35 U.S.C. 154(b) by 771 days.

(21) Appl. No.: 09/784,847

(22) Filed: Feb. 15, 2001

(51) Int. Cl.$^7$ .............................................. G06F 15/16
(52) U.S. Cl. ...................................................... 709/250
(58) Field of Search ................................. 709/249, 250, 709/217, 218, 223, 225, 227–230; 370/389, 370/395.1, 395.2, 395.21, 395.3, 395.6, 409, 370/397, 399

(56) References Cited

U.S. PATENT DOCUMENTS

| | | | | |
|---|---|---|---|---|
| 6,041,054 | A * | 3/2000 | Westberg | 370/389 |
| 6,393,025 | B1 * | 5/2002 | Merritt | 370/395.6 |
| 6,483,838 | B1 * | 11/2002 | Ostman et al. | 370/395.31 |
| 2002/0057676 | A1 * | 5/2002 | Cohen-Adiv et al. | 370/352 |

FOREIGN PATENT DOCUMENTS

GB        2329550 A * 3/1999 ........... H04L 29/06

OTHER PUBLICATIONS

Douglas E. Comer, Internetworking with TCP/IP, 2000, Prentice Hall, vol. 1, pp. 356-359, Chapter 18.*
W. Simpson; Entitled, "Request for Comments: 1661—Point to Point Protocol"; Available from www.ietf.org ; Jul. 1994; 54 Pages.
The ATM Forum Technical Committee; Entitled, "AF-VTOA-0113.000—ATM Trunking using AAL2 for Narrowband Services"; Feb. 1999; 58 Pages.
Publication Entitled, "Series 1: Integrated Services Digital Network" By International Telecommunication Union, Sep., 1997 (49 pages).
Request for Comments: 2661 Entitled, Layer Two Tunneling Protocol "L2TP" By Townsley, et al. Aug. 1999 (80 Pages).

* cited by examiner

Primary Examiner—Kim Huynh
Assistant Examiner—David Martinez
(74) Attorney, Agent, or Firm—Narendra R Thappeta (57) ABSTRACT

Data related to multiple point-to-point sessions is transmitted on a single virtual circuit of a ATM based network. In an embodiment implemented in accordance with ATM Adaptation Layer 2 (AAL2), the data related to each session is transported on a channel of the AAL2 virtual circuit. As the intermediate devices in the virtual circuit path merely need to maintain tables for one virtual circuit, the overhead on the devices may be minimized. By assigning data of a session to a channel provided by an adaptation layer, addition fields or higher level protocols may not be needed to transport the data related to the sessions.

14 Claims, 5 Drawing Sheets

SUPPORTING MULTIPLE POINT-TO-POINT SESSIONS BETWEEN NETWORK DEVICES ON AN ATM BACKBONE

BACKGROUND OF THE INVENTION

1. Field of the Invention

The present invention relates to communication networks, and more specifically to a method and apparatus implemented for supporting multiple point-to-point sessions between network devices on an Asynchronous Transfer Mode (ATM) backbone.

2. Related Art

Point-to-point sessions ("PPP sessions") are often set up between remote systems (e.g., personal computer systems at homes) and communication networks. A PPP session generally allows data transfer between a remote system and a termination device situated at the edge of a communication network. Point-to-point protocol (PPP) described in request for comment (RFC) 1661, available from www.ietf.org, is a common protocol using which point-to-point sessions are established.

The termination device usually provides additional communication to enable a remote system (at one end of a session) to communicate with a target host as is also well known in the relevant arts. The communication between a host and a remote system forms the basis for several user applications. As the host systems and remote systems are at either end of corresponding applications, the two systems are commonly referred to as end systems.

Asynchronous Transfer Mode (ATM) is often used to provide high speed backbone in communication networks. As is well known, virtual circuits are provisioned in the ATM backbone between network devices. A network device refers to a device which performs the switching task in forwarding ATM cells. Virtual circuits provide the basis for transfer of data in ATM backbone. Supporting PPP sessions on ATM backbone also thus requires provisioning of virtual circuits.

Each virtual circuit generally consumes several resources on intermediate network devices in the path of a virtual circuit. Typical resources consumed include memory space, queue structures, etc., either in software or in the application specific integrated circuits (ASIC) supporting the data transfers on the virtual circuits. Optimal use of such resources is important to provide superior services (high throughput, low latency, etc.) to the end applications as is well known in the relevant arts.

In one prior approach based on AAL5 (ATM Adaptation Layer 5), a virtual circuit is provisioned for each point-to-point session. Unfortunately, the resulting large number of circuits may consume an undesirable amount of resources on the intermediate network devices, and the solution may thus be not suited in several environments.

In another approach based on tunnels, a tunnel may be set up using one virtual circuit and several sessions may be supported on the single virtual circuit. An implementation of tunnel is described in RFC 2661, which is incorporated in its entirety herewith. Such a solution minimizes the resources consumed from intermediate devices. However, the solution requires additional fields within the payload of the ATM cell, with the result that the effective data (for user applications) throughput can be proportionately reduced.

Accordingly what is needed is a method and apparatus which enables many point-to-point sessions to be supported on an ATM network while minimizing the overhead on intermediate devices and yet potentially allowing for a high effective data throughput for end applications.

SUMMARY OF THE INVENTION

An aspect of the present invention allows data related to multiple point-to-point sessions to be transmitted in a single virtual circuit implemented using asynchronous transfer mode (ATM) protocol, potentially without requiring higher layer protocols such as tunnels. Data related to each point-to-point session may be transmitted on one of a plurality of channels defined by the adaptation layer of ATM. As the data of the point-to-point sessions is transmitted on a single virtual circuit, the overhead on intermediate devices is reduced. In addition, as the data can be transmitted without additional protocol (e.g., tunneling protocol) overhead, a high data throughput may also be attained.

In one embodiment implemented in the context of ATM Adaptation Layer 2 (AAL2), each channel is identified by a channel identifier according to the AAL2 specification. By mapping data related to each session to a channel, the cell format may be maintained consistent with AAL2 specification, and any intermediate devices may merely need to be implemented consistent with AAL2 specification. The virtual circuit may be implemented between a network access server (NAS) and a home gateway in a communication network.

An implementation of NAS contains a forwarding table storing a mapping of each of the session identifiers (uniquely identifying a session) to a virtual circuit identifier and a channel identifier. A forwarding engine receives data on the point-to-point sessions, and determines the virtual circuit identifier and channel identifier corresponding to each session by examining the forwarding table.

An encapsulator receives the virtual circuit identifier and the channel identifier, and generates AAL2 cells encapsulating the data related to the session. An output interface receives the cells from the encapsulator and transmits the cells on the virtual circuit. The cells may be processed by a home gateway as described below.

The home gateway may contain an input interface which receives the cells on the virtual circuit. A de-encapsulator examines each of the plurality of cells and associates the payload data in each cell to a corresponding channel identifier. The channel identifier and a virtual circuit identifier uniquely identify a session. A mapping table stores the corresponding map of the virtual circuit identifier and the channel identifier to a session identifier.

A demultiplexor receives the channel identifier and the virtual circuit identifier from the de-encapsulator, and generates the session identifier by interfacing with the mapping table. A session manager receives payload data and corresponding session identifier, and transmits the payload on a session identified by corresponding session identifier.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention is described with reference to the accompanying drawings, wherein.

DETAILED DESCRIPTION OF THE PREFERRED EMBODIMENTS

1. Overview and Discussion of the Invention

A network device in accordance with the present invention transmits data related to several point-to-point sessions on a single virtual circuit of an ATM network. As a result, the overhead of managing the virtual circuits is minimized in any intermediate devices in the virtual circuit path of the point-to-point sessions. The data related to each point-to-point session may be transmitted in a channel defined by the adaptation layer of the ATM network. As a result, additional fields not necessitated by ATM protocols, may not be required in the ATM cells carrying the data related to the point-to-point sessions.

Only the details of ATM as relevant to an understanding of the described embodiments is provided herein. For further details on ATM, the reader is referred to a book entitled, "ATM: Theory and Application", ISBN Number: 0-07-060362-6, by David E. McDysan and Darren L. Spohn, which is incorporated in its entirety herewith.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in several other environments.

2. Example Environment

Figure 1:
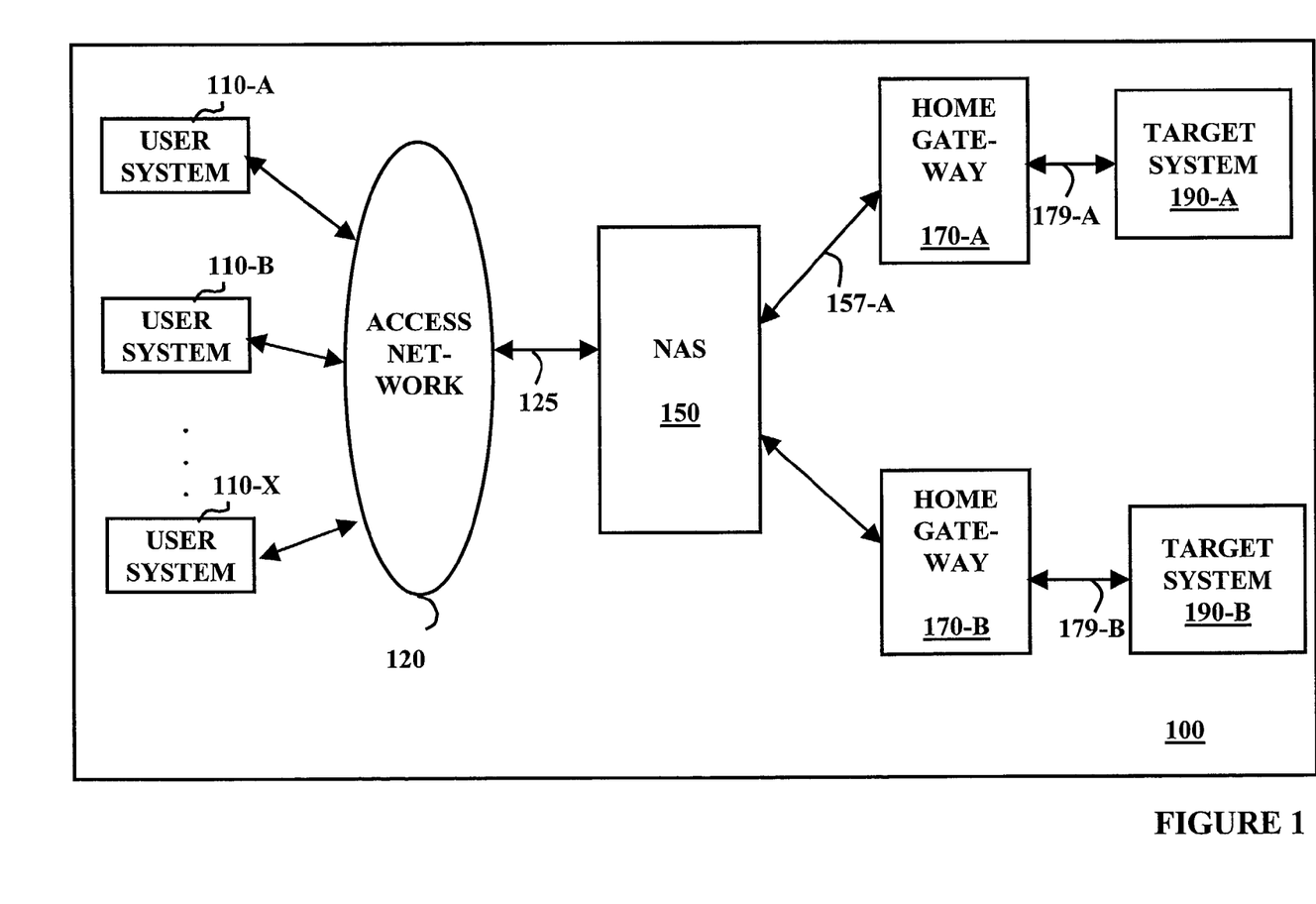
FIG. 1 is a block diagram illustrating an example communication network in which the present invention can be implemented.

FIG. 1 is a block diagram illustrating an example communication network 100 in which the present invention can be implemented. Communication network 100 is shown containing user systems 110-A through 110-X, access network 120, network access server 150, home gateways 170-A and 170-B, and target systems 190-A and 190-B. Each component is described below in further detail.

User systems 110-A through 110-X are used by subscribers (or end users) to access target systems of interest. Devices commonly known as customer premise equipment (CPE) and computer systems with modems are examples of user systems 110-A through 110-X. Each user system 110-A through 110-X may access a desired target system 190-A or 190-B. Only a few representative user systems and target systems are included in FIG. 1 for illustration. Typical environments contain many more systems in reality. Access network 120 provides the electrical and physical interface consistent with the technology (e.g., remote access, Digital Subscriber Line) used by the corresponding user system.

Network access server (NAS) 150 aggregates the data related to point-to-point sessions in a single virtual circuit, and transfers the data to home gateway 170-A on path 157-A. Similarly, network access server 150 may receive data related to several point-to-point sessions on path 157-A. Network access server 150 may separate the received data to eventually forward the data in corresponding point-to-point sessions to the respective end system 110-A through 110-X.

Home gateways 170-A and 170-B are described with reference to home gateway 170-A only for conciseness. Home gateway 170-A may be implemented similar to network access server 150 in respect of supporting point-to-point sessions. Accordingly, the data transfer in one direction is described with reference to home gateway 170-A and the data transfer in another direction is described with reference to network access server 150. However, the details described in both network devices can be used to implement network devices in accordance with various aspects of the present invention.

With respect to domains, access network 120 (along with potentially network access server 150) may be viewed as being part of an access domain. Target systems 190-A and 190-B may respectively be viewed as being part of their respective service domains. Even though home gateway 170-A is shown associated with both service domains, multiple domains may be served by a single gateway, and/or multiple gateways may serve a single domain.

Path 157-A typically contains several intermediate network devices (not shown), and may thus be logically viewed as core backbone also. Path 157-A may support several virtual circuits. However, data related to several point-to-point sessions is transported on a single virtual circuit. As a result the number of virtual circuits on path 157-A required to support point-to-point sessions is minimized.

Example embodiments of NAS 150 and home gateway 170-A are described below with reference to AAL2 (ATM Adaptation Layer 2). Accordingly, a brief introduction to AAL2 is provided first. The cell format used in the embodiments is also briefly described.

2. AAL2 and the Cell Format in General

Only the details of AAL2 as relevant to a general understanding of several aspects of the present invention are noted. For further details on AAL2, the reader is referred to a document entitled, "ITU-T Recommendation I.363.2: B-ISDN ATM Adaptation Layer Specification: Type 2 AAL", which is incorporated into the present application in its entirety. As is well known, each AAL2 virtual circuit may provide transport for up to 255 sessions, with the aggregate bandwidth across all sessions potentially equaling the total bandwidth of the physical media.

The available aggregate bandwidth may be distributed unequally between the channels. More than one AAL2 virtual circuit may be present between any two network devices. Accordingly, each AAL2 virtual circuit may be identified by a AAL2 circuit identifier. In addition, each channel within a AAL2 virtual circuit may be identified by a channel identifier (having a value in the range of 1 to 255).

An aspect of the present invention enables the data related to multiple point-to-point sessions to be aggregated on a single AAL2 virtual circuit. The data related to each point-to-point session may be transported on one of the corresponding channels in the AAL2 virtual circuits. In addition, the cell format may be maintained consistent with AAL2 specifications as described below in further detail.

3. Network Access Server

Figure 2:
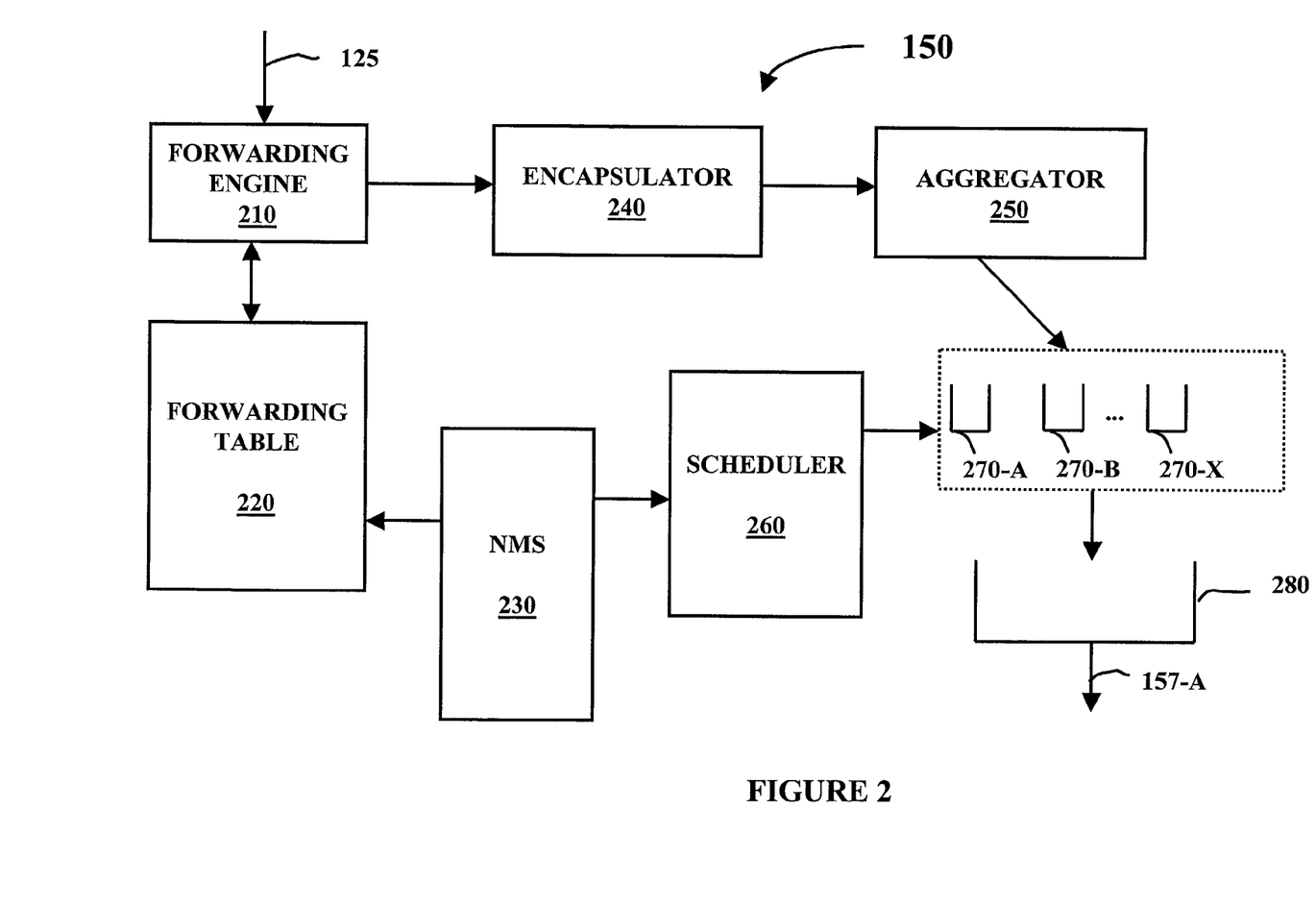
FIG. 2 is a block diagram of the internals of a network access server (NAS) illustrating the manner in which multiple point-to-point sessions are aggregated into a single virtual circuit in an embodiment of the present invention.

FIG. 2 is a block diagram depicting the details of network access server 150 in one embodiment as relevant to upstream (from subscriber to service domain) processing of data. Network access server 150 is shown containing forwarding engine 210, forwarding table 220, network management station 230, encapsulator 240, aggregator 250, scheduler 260, session queues 270-A through 270-X, and output interface queue 280.

Each component of network access server 150 may be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing network access server 150 with a desired mix of hardware, software and/or firmware. Each component of network access server 150 is described below in further detail.

Forwarding engine 210 receives packets related to different point-to-point sessions from user systems 110-A through 110-X. Forwarding engine 210 uses the session identifier in each packet to determine the manner in which the data in the packet is to be forwarded. With respect to AAL2 cells to be forwarded on output interface queue 280, forwarding engine 210 determines a AAL2 circuit identifier and a channel identifier by sending the session identifier to forwarding table 220. AAL2 circuit identifier and the channel identifier may be sent to encapsulator 240.

Forwarding table 220 stores a mapping of each point-to-point session to a corresponding channel (i.e., AAL2 circuit identifier and channel identifier). Forwarding table 220 may be populated either dynamically (i.e., based on some protocol automatically) or statically (by manual configuration). In one embodiment, network management station 230 provides a convenient interface (e.g., SNMP based, and/or command line interface) using which a user may statically specify the relationship of each point-to-point session to the corresponding channel.

Encapsulator 240 encapsulates data related to each session in AAL2 format. The corresponding cell format is described in ITU-T Recommendation I.363.2 noted above. In general, encapsulator needs to encapsulate the data related to the session consistent with the protocol of transmission medium (on 157-A).

Aggregator 250 awaits the reception of sufficient data forming the full payload of an ATM cell, and sends the data in the form of a cell for each point-to-point session to a corresponding one of the session queues 270-A through 270-X. However, if a pre-specified time expires before reception of a subsequent point-to-point session packet, aggregator 250 may send residue data from a previous packet (i.e., the one before the subsequent packet) in the form of an ATM cell.

Aggregator 250 may perform a task commonly referred to as sub-cell multiplexing, in which data related to different sessions are transmitted in the same AAL2 cell. When data related to each session is received in small portions, sub-cell multiplexing allows for efficient use of the bandwidth on path 157-A. Sub-cell multiplexing is also described in further detail in ITU-T Recommendation I.363.2 noted above.

Queues 270-A through 270-X enable different quality of services (QOS) to be provided to different channels within a AAL2 virtual circuit, and also different services to different virtual circuits. One queue may be maintained for each channel. Similarly, a queue may be assigned to other virtual circuits also. Typically, a large memory (not shown) is used to store the cells, and linked lists are maintained indicating the order in which cells are to be transmitted.

Scheduler 260 selects cells from different queues 270-A through 270-X, and places the selected cells in output interface queue 280 consistent with the queuing structure adopted. The cells are selected consistent with the QOS (bit rates, etc.) desired for each of the corresponding channels (and virtual circuits), and the selection may be performed in a known way. The services desired for each channel may be specified by a user using network management station 230. Thus, an aspect of the present invention enables a service provider to provide differentiated services (e.g., bandwidth, latency) for different sessions/channels.

Output interface queue 280 represents the sequence (e.g., in the form of a linked list) in which the cells from different AAL2 virtual circuits are to be transmitted on path 157-A. An output queue is present for each transmission line. The cells are transmitted in the sequence indicated by Output interface queue 280.

Figure 3:
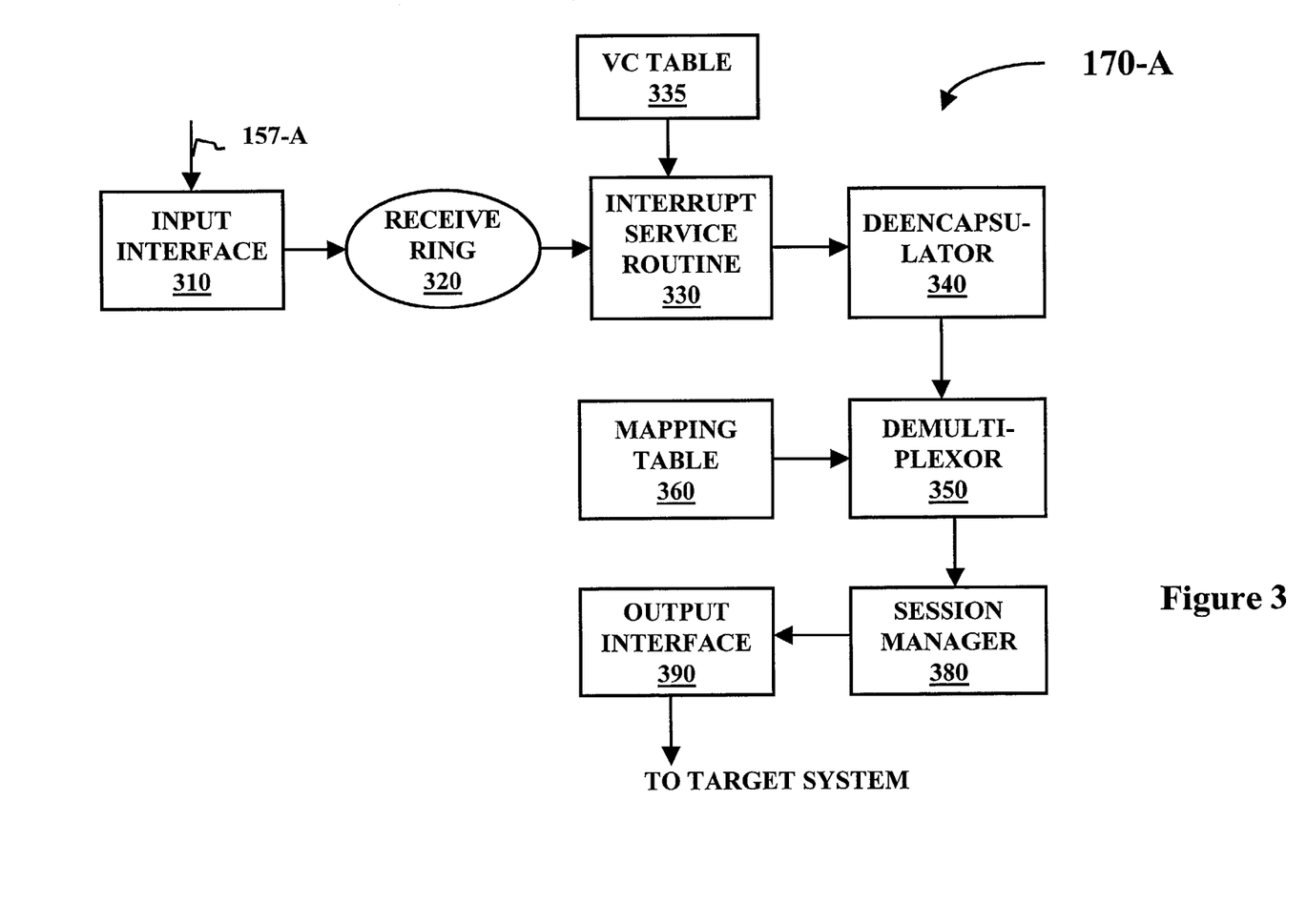
FIG. 3 is a block diagram of the internals of a home gateway illustrating the manner in which data related to multiple point-to-point sessions are recovered from a single virtual circuit in an embodiment of the present invention.

Once the cells of the AAL2 virtual circuits are transmitted, a network device at the other end of the point-to-point sessions may recover the data related to the corresponding sessions. The manner in which such recovery is performed is explained with reference to home gateway 170-A below. It should be understood that the components of described below with reference to home gateway 170-A may be present in network access server 150 as well to facilitate reception of virtual circuits constructed in accordance with the present invention.

4. Home Gateway 170

FIG. 3 is a block diagram illustrating the internal details of an embodiment of home gateway 170-A. Home gateway 170-A is shown containing input interface 310, receive ring 320, interrupt service routine 330, VC (virtual circuit) table 335, de-encapsulator 340, demultiplexer 350, mapping table 360, session manager 380, and output interface 390. Each component is described below in further detail.

Input interface 310 receives ATM cells on core backbone 157-A and stores the cell data in receive ring 320. Input interface 310 generally provides the electrical and other protocol interfaces to recover the ATM cells from core backbone 157-A and may be implemented in a known way. Receive ring 320 may be implemented in a memory also in a known way.

Interrupt service routine 330 receives an interrupt typically on receiving each ATM cell. Interrupt service routine 330 determines the specific adaptation layer using which the cell is to be processed by examining in VC table 335 an entry corresponding to the VCI/VPI of the cell. The cell is passed to the corresponding de-encapsulator. For illustration, it is assumed that the cell is to be processed consistent with AAL2, and accordingly the cell is passed to de-encapsulator 340. VC table 335 stores information indicating the specific ATM adaptation layer using which each virtual circuit is configured.

Mapping table 360 provides a mapping of the ATM circuits to the corresponding session identifiers. The information in mapping table 360 is maintained to be consistent with the information in forwarding table 220 of FIG. 2. In addition, mapping table 360 indicates that specific virtual circuits contain data related to PPP sessions in accordance with the present invention. As a result, the cells on core backbone 157-A may be implemented to be consistent with ITU-T Recommendation I.363.2 and intermediate devices may merely need to be implemented consistent with ATM specifications.

De-encapsulator 340 parses each cell to associate the payload data to the corresponding channel identifier contained within the cell. De-multiplexor 350 maps the ATM virtual circuit identifier (of the cell) and the channel identifier to a corresponding session identifier by examining the entry corresponding to the virtual circuit identifier and channel identifier in mapping table 360. The session identifier and the corresponding payload data in the ATM cell are passed to session manager 380.

Session manager 380 receives the payload data and transmits the data to target system 190-A related to a session identified by the session identifier. Output interface 390 provides the necessary physical, electrical and protocol interface on a medium connecting to target system 190-A, and session manager 380 uses output interface 390 to transmit the data according to higher level protocols. In general, the data received on each point-to-point session is encapsulated consistent with the medium and protocol using which target system 190-A is designed to receive, and target system 190-A thus receives the data related to the point-to-point session. Session manager 380 and output interface 390 may be implemented in a known way.

Thus, a receiving network device (here home gateways 170-A and 170-B) may recover the data corresponding to multiple point-to-point sessions received on a single virtual circuit. The description is continued with reference to a method implemented in accordance with the present invention.

5. Method and Example Transaction

Figure 4:
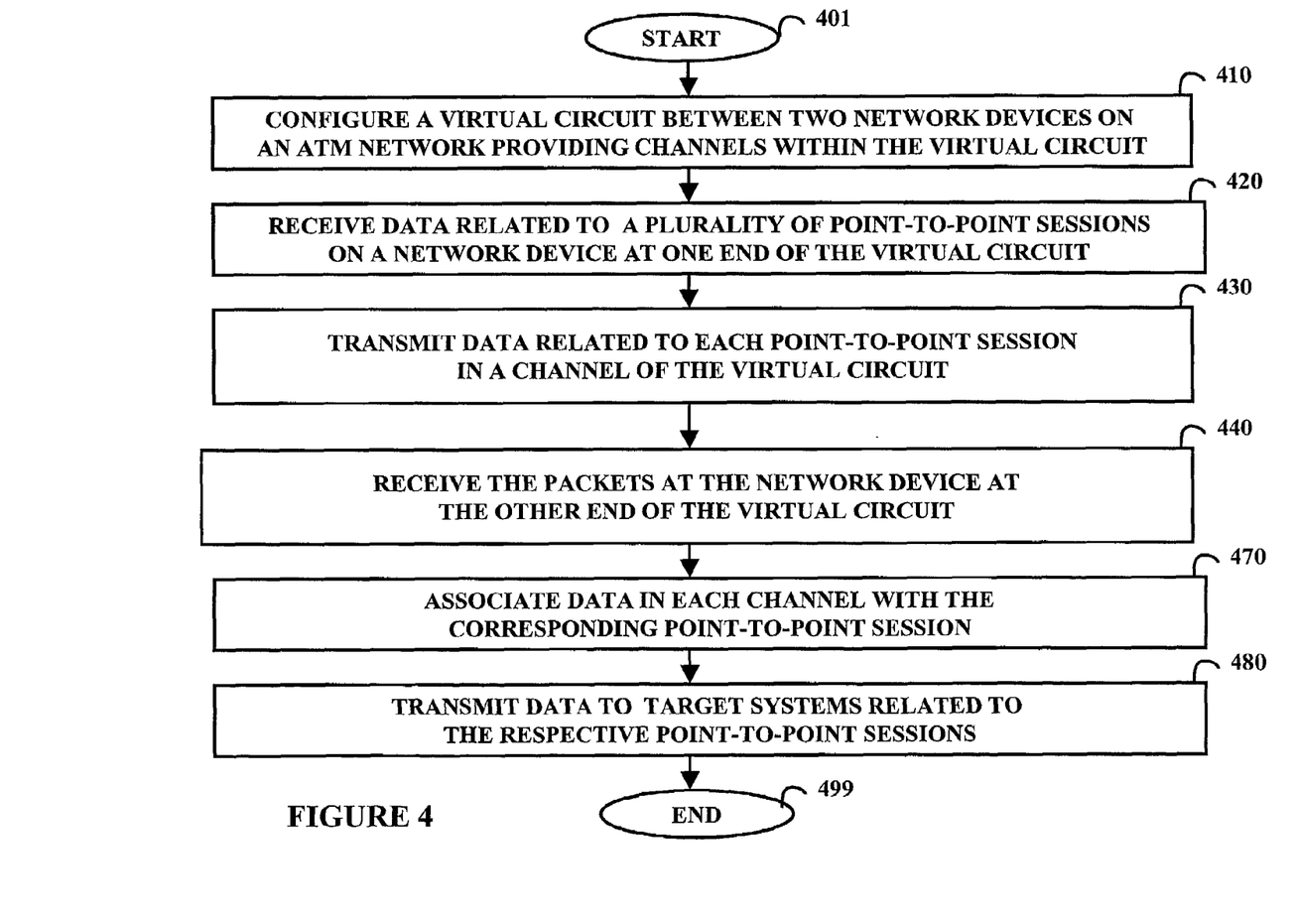
FIG. 4 is a flow chart illustrating a method in accordance with the present invention.

FIG. 4 is a flow chart illustrating a method in accordance with the present invention. The method is described with reference to the system of FIG. 1 for illustration. However, the method may be implemented in other environments also. The method begins in step 401, in which control immediately passes to step 410.

In step 410, a virtual circuit is configured on a backbone between two network devices (e.g., between NAS 150 and home gateway 170-A). The protocol on the backbone network needs to allow multiple channels within the virtual circuit, for example, as provided by AAL2. The virtual circuit may be configured statically at the two end points as noted above, or by appropriate signaling protocols.

In step 420, a network device ("sending network device") at one end of the virtual circuit may receive data related to several point-to-point sessions, with the two points of each point-to-point session being connected by the backbone on which the virtual circuit is configured.

In step 430, the sending network device transmits data related to the point-to-point session in the form of cells on the configured virtual circuit. The data related to each point-to-point session is transmitted on a channel of the virtual circuit.

In step 440, a network device ("receiving network device") at the second end of the virtual circuit receives the cells. In step 470, the receiving network device associates the data in each cell with the corresponding point-to-point session. In the embodiments described above, the AAL2 channel identifier and virtual circuit identifier together uniquely map to a session identifier, and the data in the cell is associated with the corresponding session using the session identifier. In step 480, the data in the cells is transmitted to a target system related to the corresponding session.

As noted above, several features of the present invention can be implemented in a combination of one or more of hardware, software, and firmware. An embodiment implemented in the form of sequences of instructions (software and/or firmware) which control hardware is described below.

6. Software Implementation

Figure 5:
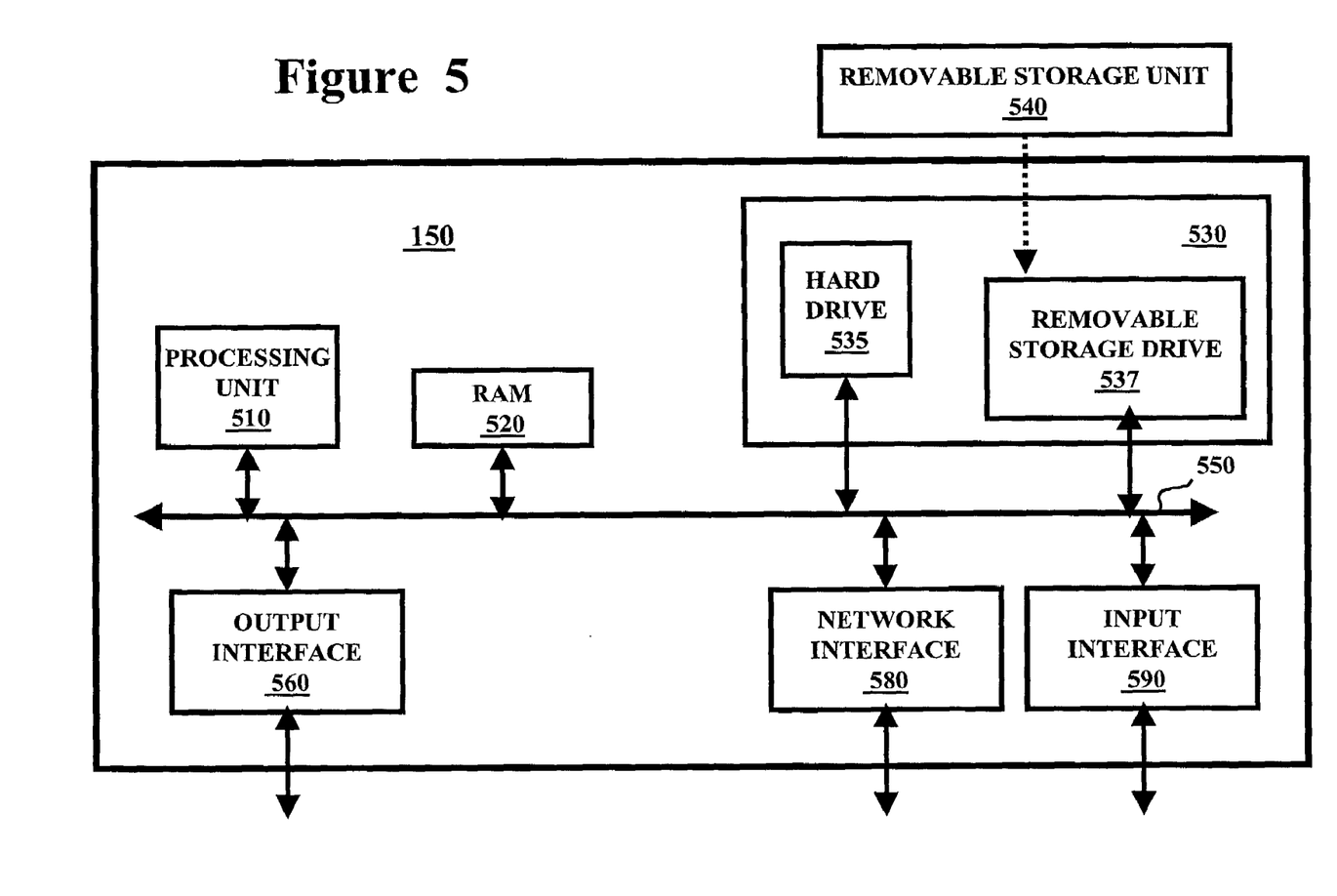
FIG. 5 is a block diagram illustrating an embodiment of the present invention implemented substantially in the form of software.

FIG. 5 is a block diagram illustrating the details of a network device (e.g., NAS 150) in one embodiment. NAS 150 is shown containing processing unit 510, random access memory (RAM) 520, storage 530, output interface 560, network interface 580 and input interface 590. Each component is described in further detail below.

Output interface 560 provides output signals (e.g., display signals to a display unit, not shown) which can form the basis for a suitable user interface for a user to interact with NAS 150. Input interface 590 (e.g., interface with a keyboard and/or mouse, not shown) enables a user to provide any necessary inputs to NAS 150. Output interface 560 and input interface 590 can be used, for example, to enable configuration of NAS 150.

Network interface 580 enables NAS 150 to send and receive data on communication networks using protocols as asynchronous transfer mode (ATM). Network interface 580 may correspond to input interface 310 and output interface 390 of FIG. 3. Network interface 580, output interface 560 and input interface 590 can be implemented in a known way.

RAM 520 and storage 530 may together be referred to as a memory. RAM 520 may receive instructions and data on path 550 from storage 530. Storage 530 may contain units such as hard drive 535 and removable storage drive 537. Storage 530 may store the software instructions and data, which enable NAS 150 to provide several features in accordance with the present invention.

Some or all of the data and instruction may be provided on removable storage unit 540, and the data and instructions may be read and provided by removable storage drive 537 to processing unit 510. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520. In general processing unit 510 reads sequences of instructions from various types of memory medium (including RAM 520, storage 530 and removable storage unit 540), and executes the instructions to provide various features of the present invention.

Using such an implementation, a sending network device may transmit data related to multiple point-to-point sessions on a single virtual circuit. Similarly, a receiving network device can associate the received data with the corresponding sessions. As a result, multiple point-to-point sessions can be readily supported on a single virtual circuit in accordance with the present invention. The overhead on any intermediate network devices is minimized as the devices merely need to be configured for one virtual circuit.

In addition, as the sessions related data is mapped directly to the channels provided by the virtual circuit, additional higher level protocols (such as tunnels) may not be required. As a result, additional fields to support point-to-point sessions may not be required in each ATM cell, and the use of the payload field (in ATM cells) for user application may be maximized.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting a plurality of point-to-point sessions in a network device contained in a communication network, each point-to-point session being identified by a session identifier and having a user system at one end, said communication network containing a backbone implemented according to asynchronous transfer mode (ATM) protocol, said method comprising:

receiving in said network device data on said plurality of point-to-point sessions;

determining a virtual circuit identifier and a channel identifier corresponding to each of said plurality of sessions, wherein said virtual circuit identifier comprises VPI/VCI (virtual path identifier/virtual circuit identifier) and uniquely identifies a virtual circuit configured on said communication network and said channel identifier identifies a channel within said virtual circuit, said channel being provided according to an adaptation layer of said ATM protocol;

generating a plurality of cells encapsulating said data, wherein said plurality of cells are generated for transmission on said virtual circuit identified by said virtual circuit identifier, data related to each of said plurality of point-to-point sessions being encoded in a corresponding channel identified by the corresponding channel identifier;

maintaining a plurality of input queues, each of said plurality of input queues being associated with a corresponding one of said channels provided within said virtual circuit;

storing cells related to each of said channels in a corresponding one of said plurality of said input queues; and placing in an output queue, cells from different input queues according to the QoS requirements of the individual channels, and transmitting from said network device said plurality of cells to provide different QOS to different channels such that corresponding different QOS are provided to different ones of said plurality of point-to-point sessions, wherein transmitting on said single virtual circuit minimizes the number of virtual circuits on said backbone, and wherein said transmitting transmits cells from said output queue in a sequential order, whereby a first cell placed in a first input queue is transmitted after a second cell placed in a second input queue even though said first cell is placed in said first input queue before said second cell is placed in said second input queue, wherein said first input queue and said second input queue are contained in said plurality of input queues.

2. The method of claim 1, further comprising storing in said network device a mapping of each of said session identifiers to said virtual circuit identifier and said channel identifier, wherein said determining is performed based on said mapping.

3. The method of claim 2, wherein said adaptation layer comprises ATM adaptation layer 2 (AAL2) and each of said plurality of point-to-point sessions are implemented according to PPP protocol.

4. The method of claim 1, wherein said network device comprises one of network access server and home gateway.

5. A network device for supporting a plurality of point-to-point sessions on a backbone supporting an asynchronous transfer mode (AIM) protocol each point-to-point session being identified by a session identifier and being set up between a corresponding pair of systems, said network device comprising:

a forwarding engine receiving data on said plurality of point-to-point sessions, said forwarding engine determining a virtual circuit identifier and a channel identifier corresponding to each of said plurality of sessions, wherein said virtual circuit identifier comprises VPI/VCI (virtual path identifier/virtual circuit identifier) and uniquely identifies a virtual circuit configured on said communication network and said channel identifier identifies a channel in said virtual circuit, said channel being defined by an adaptation layer of said ATM protocol;

a memory providing for a plurality of input queues and an output queue, each of said plurality of input queues being associated with a corresponding one of said channels provided within said virtual circuit, wherein cells related to each of said channels are stored in a corresponding one of said plurality of said input queues;

an encapsulator receiving said virtual circuit identifier and said channel identifier, said encapsulator generating a plurality of cells encapsulating said data, wherein said plurality of cells are generated for transmission in said channel identified by said channel identifier, said channel being contained in said virtual circuit identified by said virtual circuit identifier;

a scheduler placing in said output queue, cells from different input queues according to the QoS requirements of the individual channels; and an output interface receiving said plurality of cells from said encapsulator and transmitting said plurality of cells to provide different QOS to different channels such that corresponding different QoS are provided to different ones of said plurality of point-to-point sessions, wherein said output interface transmits cells from said output queue in a sequential order, whereby a first cell placed in a first input queue is transmitted after a second cell placed in a second input queue even though said first cell is placed in said first input queue before said second cell is placed in said second input queue, wherein said first input queue and said second input queue are contained in said plurality of input queues.

6. The network device of claim 5, further comprising a forwarding table storing a mapping of each of said session identifiers to said virtual circuit identifier and said channel identifier, wherein said forwarding engine determines said virtual circuit identifier and said channel identifier by examining said forwarding table.

7. The network device of claim 6, wherein the adaptation layer of said ATM cells is implemented consistent with ATM adaptation layer 2 (AAL2) and wherein said point-to-point sessions are implemented according to PPP protocol.

8. A network device for supporting a plurality of point-to-point sessions in a network device contained in a communication network, each point-to-point session being identified by a session identifier and having a user system at one end, said communication network containing a backbone implemented according to asynchronous transfer mode (ATM) protocol, said network device comprising:
  means for receiving data on said plurality of point-to-point sessions;
  means for determining a virtual circuit identifier and a channel identifier corresponding to each of said plurality of sessions, wherein said virtual circuit identifier comprises VPI/VCI (virtual path identifier/virtual circuit identifier) and uniquely identifies a virtual circuit configured on said communication network and said channel identifier identifies a channel within said virtual circuit, said channel being provided according to an adaptation layer of said ATM protocol;
  means for maintaining a plurality of input queues, each of said plurality of input queues being associated with a corresponding one of said channels provided within said virtual circuit;
  means for generating a plurality of cells encapsulating said data, wherein said plurality of cells are generated for transmission on said virtual circuit identified by said virtual circuit identifier, data related to each of said plurality of point-to-point sessions being encoded in a corresponding channel identified by the corresponding channel identifier; a
  means for storing cells related to each of said channels in a corresponding one of said plurality of said input queues;
  means for placing in said output queue, cells from different input queues according to the QoS requirements of the individual channels; and
  means for transmitting from said network device said plurality of cells to provide different QOS to different channels such that corresponding different QOS are provided to different ones of said plurality of point-to-point sessions, wherein said means for transmitting transmits cells from said output queue in a sequential order,
  wherein transmitting on said single virtual circuit minimizes the number of virtual circuits on said backbone,
  whereby a first cell placed in a first input queue is transmitted after a second cell placed in a second input queue even though said first cell is placed in said first input queue before said second cell is placed in said second input queue wherein said first input queue and said second input queue are contained in said plurality of input queues.

9. The network device of claim 8, further comprising means for storing in said network device a mapping of each of said session identifiers to said virtual circuit identifier and said channel identifier, wherein said means for determining determines said virtual circuit identifier and said channel identifier by examining said means for storing.

10. The network device of claim 9, wherein said adaptation layer comprises ATM adaptation layer 2 (AAL2) and each of said plurality of point-to-point sessions are implemented according to PPP protocol.

11. The network device of claim 8, wherein said network device comprises one of network access server and home gateway.

12. A computer-readable medium carrying one or more sequences of instructions for causing a network device to support a plurality of point-to-point sessions in a communication network, each point-to-point session being identified by a session identifier and having a user system at one end, said communication network containing a backbone implemented according to asynchronous transfer mode (ATM) protocol, wherein execution of said one or more sequences of instructions by one or more processors contained in said network device causes said one or more processors to perform the actions of:
  receiving in said network device data on said plurality of point-to-point sessions;
  determining a virtual circuit identifier and a channel identifier corresponding to each of said plurality of sessions, wherein said virtual circuit identifier comprises VPI/VCI (virtual path identifier/virtual circuit identifier) and uniquely identifies a virtual circuit configured on said communication network and said channel identifier identifies a channel within said virtual circuit, said channel being provided according to an adaptation layer of said ATM protocol;
  maintaining a plurality of input queues, each of said plurality of input queues being associated with a corresponding one of said channels provided within said virtual circuit;
  generating a plurality of cells encapsulating said data, wherein said plurality of cells are generated for transmission on said virtual circuit identified by said virtual circuit identifier, data related to each of said plurality of point-to-point sessions being encoded in a corresponding channel identified by the corresponding channel identifier;
  storing cells related to each of said channels in a corresponding one of said plurality of said input queues; and
  placing in an output queue, cells from different input queues according to the QoS requirements of the individual channels;
  transmitting from said network device said plurality of cells to provide different QOS to different channels such that corresponding different QOS are provided to different ones of said plurality of point-to-point sessions, wherein said transmitting transmits cells from said output queue in a sequential order,
  wherein transmitting on said single virtual circuit minimizes the number of virtual circuits on said backbone
  whereby a first cell placed in a first input queue is transmitted after a second cell placed in a second input queue even though said first cell is placed in said first input queue before said second cell is placed in said second input queue, wherein said first input queue and said second input queue are contained in said plurality of input queues.

13. The computer-readable medium of claim 12, wherein said adaptation layer comprises ATM adaptation layer 2 (AAL2) and wherein said point-to-point sessions are implemented using point-to-point protocol (PPP).

14. The computer-readable medium of claim 13, wherein said network device comprises one of a network access server and a home gateway.

* * * * *

UNITED STATES PATENT AND TRADEMARK OFFICE
CERTIFICATE OF CORRECTION

| | |
|---|---|
| PATENT NO. | : 6,981,064 B1 |
| APPLICATION NO. | : 09/784847 |
| DATED | : December 27, 2005 |
| INVENTOR(S) | : Phadnis et al. |

It is certified that error appears in the above-identified patent and that said Letters Patent is hereby corrected as shown below:

Col. 6, line 29, delete "of" after the word "components".

Col. 8, line 36, replace "instruction" with --instructions--.

Col. 11, line 26, delete "a" at the end of the line.

Signed and Sealed this

First Day of August, 2006

JON W. DUDAS
*Director of the United States Patent and Trademark Office*